US006960392B2

(12) United States Patent
Le Du et al.

(10) Patent No.: US 6,960,392 B2
(45) Date of Patent: Nov. 1, 2005

(54) STRUCTURE COMPRISING A BINDER LAYER NON-DELAMINABLE WITH RESPECT TO A METALLIZED SUBSTRATE AND PEELABLE WITH RESPECT TO A POLYPROPYLENE SUBSTRATE

(75) Inventors: Yves Le Du, Valailles (FR); Patrice Perret, Mezieres sur Seine (FR)

(73) Assignee: Arkema, Puteaux (FR)

( * ) Notice: Subject to any disclaimer, the term of this patent is extended or adjusted under 35 U.S.C. 154(b) by 370 days.

(21) Appl. No.: 09/821,796

(22) Filed: Mar. 30, 2001

(65) Prior Publication Data

US 2002/0034649 A1 Mar. 21, 2002

(30) Foreign Application Priority Data

| Mar. 30, 2000 | (FR) | ............................................. 00 04037 |
| Jul. 6, 2000 | (FR) | ............................................. 00 08790 |
| Aug. 21, 2000 | (FR) | ............................................. 00 10750 |

(51) Int. Cl.⁷ .......................... B32B 15/08; B29C 47/00
(52) U.S. Cl. ..................... 428/461; 428/35.8; 428/35.9; 428/457; 428/463; 428/516; 428/520; 156/244.11; 156/244.24; 220/359.1; 220/359.3; 220/359.4
(58) Field of Search ................................. 428/463, 520, 428/516, 35.8, 35.9, 457, 461; 427/508, 516, 542; 156/244.11, 244.24; 220/359.3, 359.4, 359.1

(56) References Cited

U.S. PATENT DOCUMENTS

| 4,398,644 A | * | 8/1983 | Claude et al. ............... 428/461 |
| 4,403,710 A | * | 9/1983 | Hirota et al. ................ 220/270 |
| 4,764,546 A | | 8/1988 | Mitsuno et al. ............. 523/213 |
| 5,206,051 A | * | 4/1993 | Theisen et al. ............. 427/458 |
| 5,235,149 A | | 8/1993 | Boehrer ............... 219/10.55 E |
| 5,367,022 A | * | 11/1994 | Kiang et al. .................. 524/74 |
| 6,224,973 B1 | * | 5/2001 | Trouilhet ..................... 428/340 |

FOREIGN PATENT DOCUMENTS

| EP | 0 258 990 A1 | 3/1988 |
| EP | 0 485 126 A2 | 5/1992 |
| JP | 4-198243 | * 7/1992 |

OTHER PUBLICATIONS

Derwent Abstract, 1992–288980, JP 04198243, Jul. 1992.*
JP 04-198243—Patent Abstract of Japan.
JP 01-082931—Patent Abstract of Japan.

* cited by examiner

Primary Examiner—Monique R. Jackson
(74) Attorney, Agent, or Firm—Millen White Zelano & Branigan, P.C.

(57) ABSTRACT

A multilayer structure of, in succession, a metal layer or a metallized-substrate layer, a layer of a polypropylene-based binder extrusion-coated at a rate of more than 100 m/min. and optionally a polypropylene layer, the metal or metallized layer and the binder layer being made non-delaminable by heat treating the structure. The extrudable binder contains by weight: (A) 5 to 30% of a copolymer of ethylene and one or more comonomers chosen from the group of carboxylic acid esters, vinyl esters and dienes in particular the ethylene/alkyl (meth)acrylate/maleic anhydride terpolymer; (B) 40 to 93% of a stretchable polypropylene; and (C) 2 to 30% of a polypropylene functionalized by an unsaturated carboxylic acid anhydride, especially maleic anhydride; the MFI of the composition being between 10 and 50 g/10 min. (at 230° C./2.16 kg). the multi-layer structure is useful for the production of packages.

20 Claims, 2 Drawing Sheets

STRUCTURE COMPRISING A BINDER LAYER NON-DELAMINABLE WITH RESPECT TO A METALLIZED SUBSTRATE AND PEELABLE WITH RESPECT TO A POLYPROPYLENE SUBSTRATE

The present invention relates to a structure comprising a polypropylene-based binder layer, that can be extrusion-coated at high speed onto a metal foil or a sheet of metallized substrate, having a non-delaminable character with respect to a completely or partially metallic layer and having a peelable character with respect to a polypropylene layer.

The present invention also relates to its use in the manufacture of metal/plastic packages, such as drink cartons, food cans, aerosol cans, paint cans and containers and covers for inter alia food.

U.S. Pat. No. 5,235,149 describes containers sealed by covers. The binder layer of the cover consists of various polymers grafted by acrylic acid or maleic anhydride; the polymers may be chosen from polyethylene, polypropylene, ethylene/vinyl acetate copolymers and ethylene/methyl acrylate copolymers.

Patent DE 19 535 915 A describes a grafted polypropylene block copolymer for bonding polypropylene films to metal foils.

Patent EP 689 505 describes structures which are similar to those described in the previous patent but which are used for making food packages.

Patent EP 658 139 describes structures similar to those described in the previous patent but the binder is a grafted polypropylene random copolymer comprising from 1 to 10% of a comonomer, the $M_w/M_n$ ratio is between 2 and 10 and the MFI (Melt Flow Index) is between 1 and 20 g/10 min. (at 230° C./2.16 kg).

A package in the form of a container with a cover as opening means must be easy to open and therefore easily peelable and must be opened cleanly and neatly. However, the peeling, which depends on the nature of the binder used to bind the cover to the container, does not always take place correctly and tears in or delamination of the cover are observed. Sometimes, it is found that the seal between container and cover is not perfect, which may result in degradation of its contents. In addition, the binders of the prior art do not allow covers to be produced at a high rate.

A novel structure binder has now been found which has a binder which exhibits good adhesion to metals (aluminium, steel, tinplate, metallized substrates) by virtue of a high-temperature heat treatment, which is extremely suitable for high speed coextrusion coating and which exhibits good sealing/peel characteristics with respect to the polypropylene substrate. This structure makes it possible to obtain excellent sealing of the cover, guaranteeing that the packages are properly sealed and that the cover can be easily, cleanly and neatly peeled off, by virtue of the non-delaminable character between the metal or metallized-substrate layer and the binder layer and by virtue of the peelable character between the binder layer and the polypropylene layer.

In addition, the novel structure has the advantages of allowing the manufacture of packages which are sterilizable and chemically resistant to the greases, acids and solvents that may be encountered within the scope of the use of these packages.

The MFI measurements on the compounds described below were carried out according to the NFT 51016 or ISO 1133 Standard.

The subject of the invention is a multilayer structure comprising a metal layer or a metallized-substrate layer and a polypropylene-based binder layer extrusion-coated at a rate of more than 100 m/min onto the said metal or metallized-substrate layer, the said layers being made non-delaminable by heat treating the said structure.

According to one embodiment of the structure, the heat treatment is carried out by infrared radiation, by passing it through a hot-air or induction-heating tunnel, the metal layer being heated to a temperature above the melting point of the binder.

According to one embodiment of the structure, the said structure comprises a polypropylene layer having a melting point above the melting point of the binder, the binder layer being sandwiched between the metal or metallized-substrate layer and the polypropylene layer.

According to one embodiment of the structure, the said structure is peelable with a peel force for peeling the binder layer off the polypropylene layer of between 8 and 15 N/15 mm.

According to one embodiment of the structure the extrudable binder comprises by weight:
  5 to 30% of a copolymer (A) based on ethylene and one or more comonomers chosen from the group of carboxylic acid esters, vinyl esters and dienes;
  40 to 93% of a stretchable polypropylene (B), stretchability being defined as the ability of a rod extruded at a temperature of between 190° C. and 240° C. and pulled at a pull rate of between 50 and 250 m/min. not to break;
  2 to 30% of a polypropylene (C) functionalized by an unsaturated carboxylic acid anhydride;
  the MFI of the composition being between 10 and 50 g/10 min. (at 230° C./2.16 kg).

According to one embodiment of the structure, the copolymer (A) of the binder is an ethylene/alkyl (meth)acrylate copolymer containing from 5 to 40% and preferably from 10 to 40% by weight of alkyl (meth)acrylate, the MFI being between 0.5 and 200 g/10 min. (at 190° C./2.16 kg).

According to another embodiment of the structure, the copolymer (A) of the binder is an ethylene/alkyl (meth)acrylate/maleic anhydride copolymer containing from 0.2 to 10% by weight of maleic anhydride and from 2 to 40% and preferably from 5 to 40% by weight of alkyl (meth)acrylate, the MFI being between 0.5 and 200 g/10 min. (at 190° C./2.16 kg).

According to another embodiment of the structure, the copolymer (A) of the binder is a blend of the copolymers (A) described above.

According to another embodiment of the structure, the proportion of polypropylene (C) of the binder is between 1.5 and 6%, the said polypropylene (C) containing from 1.5 to 6% by weight of maleic anhydride.

According to another embodiment of the structure, the proportion of polypropylene (C) of the binder is between 10 and 25%, the said polypropylene (C) containing from 0.8 to 1.5% by weight of maleic anhydride.

According to another embodiment of the structure, the proportion of polypropylene (C) of the binder is between 3 and 5%, the said polypropylene (C) containing from 1.5 to 3% by weight of maleic anhydride.

The subject of the invention is also a cover comprising a structure as described above in which the metal of the metal or metallized-substrate layer is aluminium.

The subject of the invention is also a package made of polypropylene or of a material covered with polypropylene, sealed by a cover as described above.

According to one embodiment of the package, this is made with a structure as described above.

According to one embodiment of the package, this is sterilizable and resistant to food acids and high-performance solvents and greases.

We will now describe a food package comprising a cover and a container, the said cover having a structure according to the invention. It is clear that the invention is applicable to any type of package and is not limited to only food packages.

A package of solid goods is generally composed of a container (3) and a cover (4). The container (3) is sealed by the cover (4) when the package is in the closed position.

The container (3) may be made of polypropylene or of another, possibly multilayer, material. When the container (3) is a multilayer, it then comprises an external layer (1), for example of aluminium, covered with an internal polypropylene layer (2), the internal layer being in direct contact with the food, unlike the external layer.

Figure 1A:
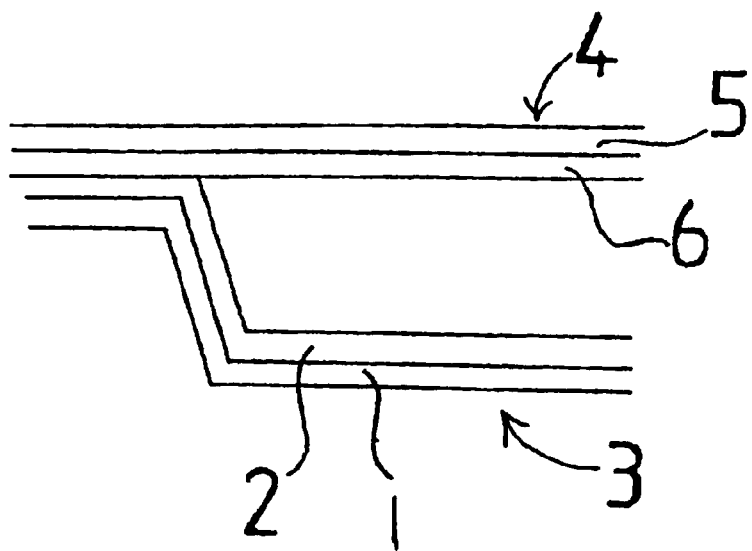
FIG. 1a shows, in cross section, part of a closed food package comprising a cover having a two-layer structure according to the invention.
Figure 1B:
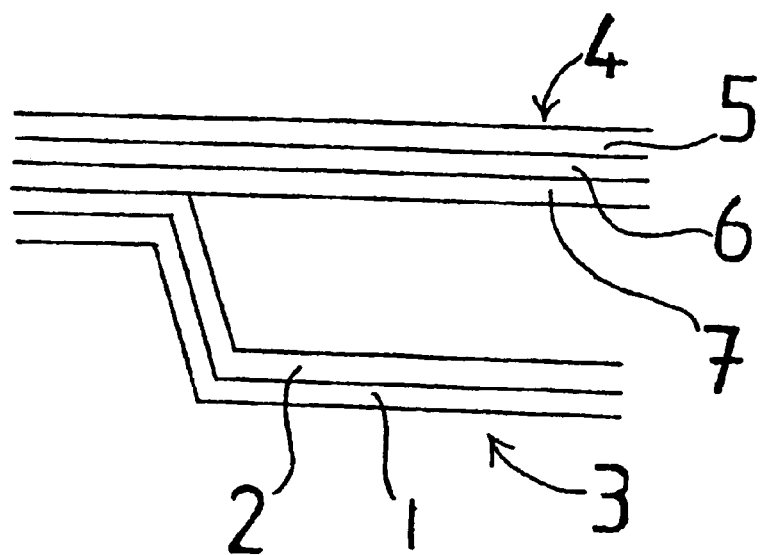
FIG. 1b shows, in cross section, part of a closed food package comprising a cover having a three-layer structure according to an embodiment of the invention.
Figure 2A:
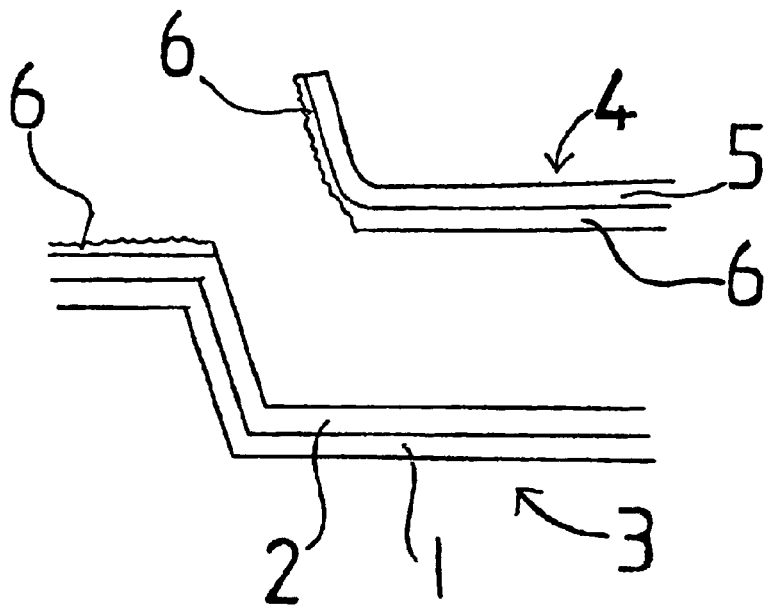
FIG. 2a shows, in cross section, the package in FIG. 1a when partially opened.
Figure 2B:
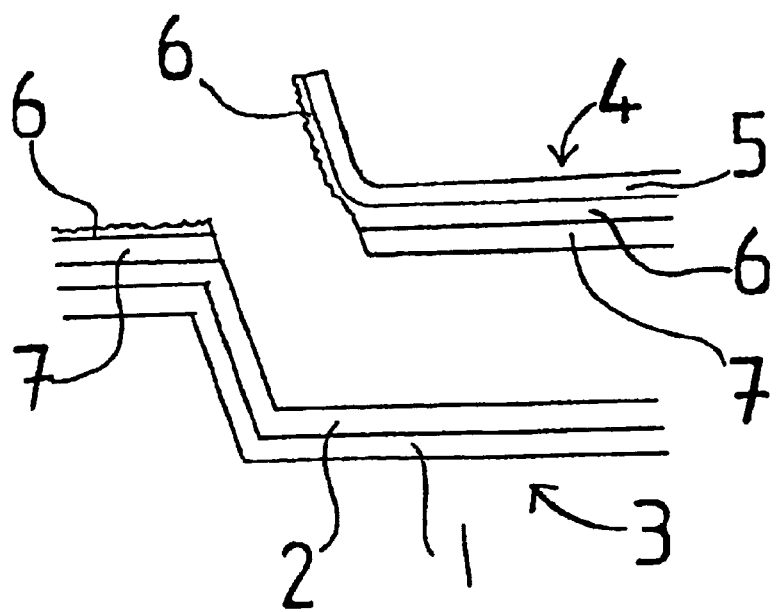
FIG. 2b shows, in cross section, the cover of FIG. 1b when partially open.

The cover (4) consists of layers bonded together which are, in order: a metal or metallized-substrate layer (5), a binder layer (6) as shown in FIG. 1a and optionally a polypropylene layer (7) as shown in FIG. 1b. The cover is heat-welded on the same side as the binder (6), or optionally on the same side as the polypropylene (7) when the latter is present, to the polypropylene layer (2) of the container (3), in general around its perimeter. Part of the cover (4) is left to extend beyond the opening surface of the container (3) in order to be able to get hold of the latter easily and to open the package. By pulling on the cover (4), a cohesive failure within the binder layer (6) of the cover (4) is induced at the weld. The binder layer (6), and optionally the polypropylene layer (7), tears, interrupting the cohesive failure. The cover and the container shown in FIGS. 2a and 2b are therefore obtained.

A little binder (6) and possibly the polypropylene layer (7) are left on the container (3) of the open package at the weld. A little binder (6) and the aluminium layer (5) are left on the cover (4) at the weld (see FIGS. 2a and 2b). At the points where the cover (4) was not welded to the container (3), the original structure of the cover is found, namely the aluminium layer (5) bonded to the binder layer (6) which is itself bonded to a polypropylene layer (7).

The binder (6) allows the cover (4) to adhere to the container (3) and also allows the cover to be peeled off without it being necessary to use a large force. A child must in fact be able to pull off the cover and open the package.

The cover (4) is manufactured by coextruding the binder layer (6) and the optional polypropylene layer (7), followed immediately by coating them onto the aluminium foil (5) or any other metallized substrate. Once the container has been filled, the cover (4) is fastened by hot welding around the edges of the container (3).

Depending on the nature of the food and the nature of the possible impurities contained in the binder (6), it is possible to use covers that do not include the polypropylene layer (7).

The extrudable binder comprises by weight, the total being 100%:

5 to 30% of a copolymer (A) based on ethylene and one or more comonomers chosen from the group of carboxylic acid esters, vinyl esters and dienes;

40 to 93% of a stretchable polypropylene (B), stretchability being defined as the ability of a rod extruded at a temperature of between 190° C. and 240° C. and pulled at a pull rate of between 50 and 250 m/min. not to break;

2 to 30% of a polypropylene (C) functionalized by an unsaturated carboxylic acid anhydride;

the MFI of the composition being between 10 and 50 g/10 min. (at 230° C./2.16 kg).

With regard to the ethylene-based copolymer (A), as comonomers mention may be made of:

the esters of unsaturated carboxylic acids, such as, for example, alkyl (meth)acrylates, the alkyls of which may have up to 24 carbon atoms. Examples of alkyl acrylates or methacrylates are, in particular, methyl methacrylate, ethyl acrylate, methyl acrylate, n-butyl acrylate, isobutyl acrylate and 2-ethylhexyl acrylate;

the vinyl esters of saturated carboxylic acids, such as, for example, vinyl acetate or vinyl proprionate;

dienes such as, for example, 1,4-hexadiene;

the polyethylene may contain several of the above comonomers.

Advantageously, the polyethylene, which may be a blend of several polymers, contains at least 50 mol % and preferably 75 mol % ethylene and its density may be between 0.86 and 0.98 g/cm$^3$. The MFI (Melt Flow Index at 190° C./2.15 kg) is advantageously between 0.1 and 1000 g/10 min.

By way of examples of polyethylenes, mention may be made of:

linear low-density polyethylene (LLDPE);

very low-density polyethylene (VLDPE);

the polyethylene obtained by metallocene catalysis in the presence of a monosite catalyst generally consisting of an atom of a metal of zirconium or titanium, and of two alkyl cyclic molecules linked to the metal. More specifically, the metallocene catalysts are usually composed of two cyclopentadiene rings linked to the metal. These catalysts are frequently used with aluminoxanes as cocatalysts or activators, preferably methylaluminoxane (MAO). Hafnium may also be used as the metal to which the cyclopentadiene is attached. Other metallocenes may include transition metals of Groups IVA, VA, VIA. Metals of the lanthanide series may also be used;

EPR (ethylene-propylene rubber) elastomers;

EPDM (ethylene-propylene-diene) elastomers;

blends of polyethylene with an EPR or an EPDM.

As an example, mention may be made of ethylene/alkyl (meth)acrylate copolymers. These copolymers contain from 5 to 40% and preferably 10 to 40% by weight of alkyl (meth)acrylate. Their MFI is between 0.5 and 200 g/10 min. (at 190° C./2.16 kg). The alkyl (meth)acrylates have already been described above.

According to one particular embodiment of the invention, the above copolymers may be functionalized by copolymerization or by grafting with an unsaturated carboxylic acid anhydride. Grafting is an operation known per se.

The unsaturated carboxylic acid anhydride may be chosen, for example, from maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methyl-bicyclo[2.2.1]hept-5-ene-2,2-dicarboxylic anhydrides. Advantageously, maleic anhydride is used. It would not be outside the scope of the invention to replace all or some of the anhydride with an unsaturated carboxylic acid such as, for example, (meth)acrylic acid.

With regard to the copolymers based on ethylene, a comonomer and the unsaturated carboxylic acid anhydride, that is to say those in which the unsaturated carboxylic acid anhydride is not grafted, these are copolymers of ethylene, an unsaturated carboxylic acid anhydride and another monomer chosen from the comonomers that were mentioned above in the case of the ethylene copolymers.

Advantageously, ethylene/alkyl (meth)acrylate/-maleic anhydride copolymers are used. These copolymers contain from 0.2 to 10% by weight of maleic anhydride and from 2 to 40%, preferably 5 to 40%, by weight of alkyl (meth)acrylate. Their MFI is between 0.5 and 200 g/10 min. (at 190° C./2.16 kg). The alkyl (meth)acrylates have already been described above.

It is possible to use a blend of several copolymers (A), whether this is a blend of non-functionalized copolymers, a blend of a functionalized copolymer with a non-functionalized copolymer or a blend of two functionalized copolymers.

By way of example, it is also possible to use a blend of an ethylene/alkyl (meth)acrylate copolymer and an ethylene/alkyl (meth)acrylate/maleic anhydride copolymer.

Non-grafted acrylate copolymers (A) are commercially available. They are produced by radical polymerization at a pressure that can be between 200 and 2500 bar and are sold in granule form.

With regard to the polypropylene (B), this is a propylene homopolymer or copolymer. By way of comonomers, mention may be made of:

alpha-olefins, advantageously those having from 3 to 30 carbon atoms. As examples of alpha-olefins, mention may be made of: propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene. These alpha-olefins may be used by themselves or as a blend of two or more of them;

dienes; (B) may also be a polypropylene block copolymer. By way of example of a polymer (B), mention may be made of:

polypropylene;

blends of polypropylene with EPDM or EPR which may also contain from 1 to 20% polyethylene.

Advantageously, the polymer (B), which may be a blend of several polymers, contains at least 50 mol % and preferably 75 mol % propylene.

The polypropylene (B) is chosen from those of so-called "extrusion coating" grade having an MFI of between 20 and 40 g/10 min. (at 230° C./2.16 kg).

With regard to the polypropylene (C) functionalized by an unsaturated carboxylic acid anhydride, this is a propylene homopolymer or copolymer functionalized by grafting. It would not be outside the scope of the invention to use unsaturated carboxylic acids and the derivatives of these acids and anhydrides. By way of example, mention may be made of acrylic acid, methacrylic acid, maleic acid, fumaric acid, itaconic acid, crotonic acid, itaconic anhydride, nadic anhydride, maleic anhydride and substituted maleic anhydrides such as, for example, dimethylmaleic anhydride. As examples of derivatives, mention may be made of salts, amides, imides and esters, such as sodium monomaleate and dimaleate, acrylamide, maleimide and dimethyl fumarate. The (meth)acrylic acid may be completely or partially neutralized by metals such as Zn, Ca and Li.

Advantageously, a polypropylene having an MFI (Melt Flow Index) of 0.1 to 10 g/10 min. (at 230° C./21.6 kg) is grafted by maleic anhydride in the presence of initiators such as peroxides. The amount of maleic anhydride actually grafted may be between 0.01 and 10% by weight of the grafted polypropylene. The grafted polypropylene may be diluted with polypropylene, EPR or EPDM rubbers, or propylene/alpha-olefin copolymers. It is also possible, according to another alternative embodiment, to co-graft a blend of polypropylene and EPR or EPDM, that is to say to add an unsaturated carboxylic acid, an anhydride or derivatives thereof to a blend of polypropylene and EPR or EPDM in the presence of an initiator.

As other examples of (C), mention may be made of blends comprising by weight:

0 to 50% and preferable 10 to 40% of at least one polyethylene or at least one ethylene copolymer;

50 to 100% and preferably 60 to 90% of at least one polymer chosen from polypropylenes and propylene copolymers these blends being grafted by a functional monomer chosen from carboxylic acids and derivatives thereof, acid chlorides, isocyanates, oxazolines, epoxydes, amines and hydroxydes, and preferably anhydrides of unsaturated dicarboxylic acids, these grafted blends possibly being diluted in at least one polyolefin essentially comprising propylene units or in at least one polymer having an elastomeric character or in blends thereof.

Advantageously, (C) contains 0.8 to 4.5% by weight maleic anhydride.

The proportion of (C) in the binder depends on the amount of maleic anhydride; according to a preferred embodiment, if (C) contains from 1.5 to 6% by weight of anhydride, all that is required is to put 1.5 to 6% thereof in the binder. According to another preferred embodiment, if (C) contains from 0.8 to 1.5% by weight of anhydride, all that is required is to put 10 to 25% thereof in the binder.

According to another preferred embodiment, if (C) contains from 1.5 to 3% by weight of anhydride, all that is required is to put 3 to 5% thereof in the binder.

The binder is manufactured by melt blending the various constituents (A), (B) and (C) in the usual machines for blending thermoplastics, such as mixers and extruders.

The binder may also contain additives such as antioxidants, antiblocking agents and processing aids such as fluoropolymers, these additives being used in the usual amounts known to those skilled in the art.

The binder may contain the additives normally used when processing polyolefins, having contents of between 10 ppm and 5% by weight, such as antioxidants based on substituted phenolic molecules, UV stabilizers, processing aids such as fatty amides, stearic acid and its salts, fluoropolymers known as agents allowing extrusion defects to be avoided, amine-based antifogging agents, antiblocking agents such as silica or talc, master batches with one or more colorants and nucleating agents among others.

The present invention relates to a structure comprising, in succession, a metal foil or a sheet of a metallized substrate, a layer of the above binder and, optionally, a polypropylene layer. This structure is useful for making covers for packages. The invention also relates to these covers and to the packages sealed by these covers.

With regard to the structure comprising, in succession, a metal foil or a sheet of a metallized substrate, a layer of the above binder and optionally a polypropylene layer, by way of example of metal mention may be made of aluminium, steel, tinplate and metallized substrates such as polyester (PET). The thicknesses are, for example in $\mu$m, 20/10/10, respectively. The polypropylene of the optional layer placed against the binder may be chosen from the polypropylenes mentioned in the case of (B).

The present invention also relates to a cover comprising the structure according to the invention. The covers usually comprise an aluminium foil on which is coated, by extrusion coating, a binder layer which is itself possibly coated on a polypropylene layer, forming in this case an (Al/binder/PP) sandwich structure. A manipulatable multilayer structure is thus obtained. Next, the binder is activated by a heat treatment consisting in raising the assembly to a temperature of between 160 and 300° C. for a few seconds. This heat treatment for activating the binder, by increasing its adhesive properties has the effect of making the metal layer non-delaminable from the binder layer. The duration and temperature of the heat treatment are determined according to the melting point of the binder, to the nature of the metal layer and to the desired result. The temperature of the heat treatment must in any case be greater than or equal to the melting point of the binder and less than the melting point of the polypropylene layer when the latter is present in the structure. The heat treatment may be carried out in line after the extrusion coating or subsequently, the adhesion between the metal layer and the binder before the heat treatment being sufficient to allow reels to be formed and to allow unreeling from the reels.

The covers are then hot welded to polypropylene containers or containers made either of polypropylene or of a material covered with polypropylene, it being possible for the said material to be aluminium, polyester or polystyrene.

Peel tests were carried out on covers (4) and containers comprising a cover (4) and packages comprising a cover (4) welded onto a polypropylene container (3).

The covers (4) used in these tests had a two-layer structure (see FIGS. 1a and 2a) comprising an aluminium layer (5) 30 $\mu$m in thickness and a binder layer (6) 30 $\mu$m in thickness. This multilayer structure was obtained by extrusion-coating the binder layer onto the aluminium layer. The structure then was made to pass through a hot-air tunnel set to a temperature of greater than 220° C. for a few seconds so as to activate the binder and obtain high adhesion. This is the so-called heat treatment. Next, the cover (4) was welded to the container (3). During this welding operation, the binder layer (6) was welded directly to the polypropylene container. A package as shown in FIG. 1a was then obtained. The binder (6) used for these tests comprised 17% by weight of PP grafted with 0.8% by weight of maleic anhydride (MAH), 17% of an ethylene/ethyl acrylate/MAH terpolymer in proportions by weight of 68/30/2 respectively, and 66% of coating homopolymer PP.

Peel tests measuring the peel strength between the aluminium layer (5) and the binder layer (6) were carried out on three covers having the structure and composition as described above, before heat treatment and after heat treatment (passing them for a few seconds through a hot-air tunnel set to a temperature of greater than 220° C.). The peel force was measured at a rate of 100 mm/min according to the NFT 54120 and NFT 54122 standards. On three covers, these peel forces before heat treatment could not be measured as they were too low, whereas those after heat treatment characterize a non-delaminable structure.

It is clearly apparent that the heat treatment makes it possible to obtain a non-delaminable metal layer (5)/binder layer (6) structure.

The peel force needed to peel the cover off the container or the opening force required to open it was then measured at a rate of 200 mm/min. according to the NFT 54120 Standard and the NFT 54122 Standard. Three packages (cover+container) were prepared and the results obtained are given in TABLE 1 below:

TABLE 1

| Package | Peel force (N/15 mm) |
|---|---|
| Package No. 1 | 10–13 |
| Package No. 2 | 9–11.5 |
| Package No. 3 | 9–11 |

These packages were opened cleanly and neatly, without the cover tearing other than at the weld zone, as shown in FIG. 2a.

The peel force values obtained demonstrate the easy peelability of the covers and therefore the ease with which packages having such covers can be opened.

The same peel tests were carried out on:

three-layer covers with a PP layer (7) 30 $\mu$m in thickness, a binder layer (6) 30 $\mu$m in thickness and an Al layer (5) 30 $\mu$m in thickness;

two-layer covers comprising a metallized PET layer (5) 30 $\mu$m in thickness and a binder layer (6) 30 $\mu$m in thickness;

three-layer covers comprising a metallized PET layer (5) 30 $\mu$m in thickness a binder layer (6) 30 $\mu$m in thickness and a PP layer (7) 30 $\mu$m in thickness; and on packages comprising a PP container and such covers, the binder (6) being that as described in the previous example. These tests gave substantially the same values as those given in TABLE 1.

The binder used in the invention adheres well to metals (aluminium, steel, tinplate and metallized substrates), this adhesion being sufficient immediately after the extrusion coating to guarantee good dimensional stability of the structures during manufacture.

The binder is extremely suitable for high-speed coextrusion coating. It may be stretched during extrusion coating at rates greater than 100 m/min. without giving rise to undesirable width instability effects.

The binder also has good sealing/peel characteristics making it possible, in particular, during the sealing operation to guarantee that the packages are sealed perfectly and, during the peeling operation, to allow easy and progressive opening, and without any deposits.

Another advantage of the binder is its very good chemical inertness guaranteeing good orgaloleptic properties—no taste or smell—good resistance of the packaging in an aggressive environment (acidic food) and good steam sterilization behaviour.

Thus, another aspect of the invention resides in providing novel binders, especially those particularly suitable for producing the structure of the invention. Still other aspects of the invention are the processes used to produce the structure of the invention.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French applications 00/04.037 and 00/08.790, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A multilayer structure comprising a metal layer or a metallized-substrate layer (5) and a binder layer (6) comprising polypropylene, extrusion-coated at a rate of more than 100 m/min. onto the metal or metallized-substrate layer, said layers (6, 5) being made non-delaminable by heat treating the said structure to a temperature above the melting point of the binder layer (6), and a polypropylene layer (2) having a melting point above the melting point of the binder, the binder layer (6) being sandwiched between the metal layer or metallized-substrate layer (5) and the polypropylene layer (2), wherein said structure is peelable between binder layer (6) and polypropylene layer (2), and said binder layer (6) comprises by weight:
   5 to 30% of a copolymer (A) based on ethylene and one or more comonomers chosen from the group consisting of carboxylic acid esters, vinyl esters and dienes;
   40 to 93% of a stretchable polypropylene (B), stretchability being defined as the ability of a rod extruded at a temperature of between 190° C. and 240° C. and pulled at a pull rate of between 50 and 250 m/min. without breaking;
   2 to 30% of an additional polypropylene (C) functionalized by an unsaturated carboxylic acid anhydride;
   the MFI of the composition being between 10 and 50 g/10 min. at 230° C./2.16 kg.

2. A structure according to claim 1, wherein the heat treatment is carried out by infrared radiation, by passing it through a hot air or induction-heating tunnel.

3. A structure according to claim 1, wherein said structure comprises polypropylene layers (7) and (2) having a melting point above the melting point of the binder, the binder layer (6) being sandwiched between the metal layer or metallized-substrate layer (5) and the polypropylene layer (7), the heat treating being at a temperature below the melting temperature of the polypropylene layer (7).

4. A process of producing the multi-layer structure of claim 3, comprising the step of extrusion-coating said binder layer at a rate of more than 100 m/min. onto said metal or metallized substrate layer, and heat treating the resultant extrusion coated structure at a temperature above the melting point of the binder layer, said heat treating being at a temperature below the melting temperature of the polypropylene layer (2).

5. A structure according to claim 3, wherein said structure is peelable with a peel force for peeling a binder layer (6) off the polypropylene layer (7,2) of between 8 and 15 N/15 mm.

6. A structure according to claim 1, wherein the copolymer (A) of the binder comprises an ethylene/alkyl (meth) acrylate copolymer containing from 5 to 40% by weight of alkyl (meth)acrylate, the MFI being between 0.5 and 200 g/10 min. at 190° C./2.16 kg.

7. A structure according to claim 6, wherein the ethylene/ alkyl (meth)acrylate copolymer contains 10–40% by weight of the alkyl acrylate.

8. A structure according to claim 1, wherein the copolymer (A) of the binder comprises an ethylene/alkyl (meth) acrylate/maleic anhydride copolymer containing from above 0 to 10% by weight of maleic anhydride and from 2 to 40% by weight of alkyl (meth)acrylate, the MFI being between 0.5 and 200 g/10 min. at 190° C./2.16 kg.

9. A structure according to claim 8, wherein the ethylene/ alkyl (meth)acrylate/maleic anhydride copolymer contains 5 to 40% by weight of the alkyl meth(acrylate).

10. A structure according to claim 1, wherein the copolymer (A) of the binder is a blend of copolymers (A), of an ethylene/alkyl (meth)acrylate copolymer containing 5 to 40% by weight of alkyl (meth)acrylate, and of an ethylene/ alkyl (meth)acrylate/maleic anhydride copolymer containing from above 0 to 10% by weight of maleic anhydride and from 2 to 40% by weight of alkyl (meth)acrylate.

11. A structure according to claim 1, in which the proportion of polypropylene (C) in the binder is between 1.5 and 6% by weight, said polypropylene (C) containing from 1.5 to 6% by weight of maleic anhydride.

12. A structure according to claim 1, in which the proportion of polypropylene (C) in the binder is between 10 and 25% by weight, said polypropylene (C) containing from 0.8 to 1.5% by weight of maleic anhydride.

13. A structure according to claim 1, in which the proportion of polypropylene (C) in the binder is between 3 and 5% by weight, said polypropylene (C) containing from 1.5 to 3% by weight of maleic anhydride.

14. A package made with a structure according to claim 1.

15. A package according to claim 14, characterized in that it is sterilizable and resistant to food acids and high-performance solvents and greases.

16. A process of producing the multi-layer structure of claim 1, comprising the step of extrusion-coating said binder layer at a rate of more than 100 m/min. onto said metal or metallized substrate layer, and heat treating the resultant extrusion coated structure at a temperature above the melting point of the binder layer.

17. A structure according to claim 1, wherein said structure is peelable with a peel force for peeling the binder layer (6) off the polypropylene layer (2) of between 8 and 15 N/15 mm.

18. A multilayer structure comprising a metal layer or a metallized-substrate layer (5) and a binder layer (6) comprising polypropylene, extrusion-coated at a rate of more than 100 m/min. onto the metal or metallized-substrate layer, said layers (6, 5) being made non-delaminable by heat treating the said structure to a temperature above the melting point of the binder layer (6), and a polypropylene layer (2) having a melting point above the binder layer (6) being sandwiched between the metal layer or metallized-substrate layer (5) and the polypropylene layer (2), wherein said structure is peelable between binder layer (6) and polypropylene layer (2), and said binder layer (6) comprises a copolymer (A) based on ethylene and carboxylic acid esters, vinyl esters and dienes; polypropylene (B), and additional polypropylene (C) functionalized by an unsaturated carboxylic acid anhydride.

19. A structure according to claim 18, wherein copolymer (A) is not grafted.

20. A multilayer structure comprising a metal layer or a metallized-substrate layer (5) and a binder layer (6) comprising polypropylene, extrusion-coated at a rate of more than 100 m/min. onto the metal or metallized-substrate layer, said structure having been heat treated to a temperature above the melting point of the binder layer (6), and a polypropylene layer (2) the binder layer (6) being sandwiched between the metal layer or metallized-substrate layer (5) and the polypropylene layer (2), wherein said structure is peelable between binder layer (6) and polypropylene layer (2), and said binder layer (6) comprises a copolymer (A) based on ethylene and carboxylic acid esters, vinyl esters and dienes; polypropylene (B), and additional polypropylene (C) functionalized by an unsaturated carboxylic acid anhydride.

* * * * *